United States Patent
Shen et al.

(10) Patent No.: US 10,418,056 B1
(45) Date of Patent: *Sep. 17, 2019

(54) MULTI-STAGE SERVO CONTROL DESIGN SYSTEM

(71) Applicant: Seagate Technology LLC, Cupertino, CA (US)

(72) Inventors: Tzung-Sz Shen, Longmont, CO (US); Bin Huang, Savage, MN (US); Raye Sosseh, Minneapolis, MN (US); Ying Qi, Edina, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/124,566

(22) Filed: Sep. 7, 2018

Related U.S. Application Data

(63) Continuation of application No. 15/907,830, filed on Feb. 28, 2018, now Pat. No. 10,096,332.

(51) Int. Cl.
| | |
|---|---|
| *G11B 5/52* | (2006.01) |
| *G11B 5/54* | (2006.01) |
| *G11B 5/596* | (2006.01) |

(52) U.S. Cl.
CPC .................. *G11B 5/59627* (2013.01)

(58) Field of Classification Search
CPC . G11B 5/566; G11B 2220/2516; G11B 15/43; G11B 15/48; G11B 5/552; G11B 5/596; G11B 5/5547; G11B 5/59627; G11B 5/5521; G11B 5/54; G11B 5/52
USPC ............ 360/71, 75, 78.05, 78.09, 78.12, 70
See application file for complete search history.

(56) References Cited

U.S. PATENT DOCUMENTS

| | | | |
|---|---|---|---|
| 6,005,742 | A | 12/1999 | Cunningham et al. |
| 6,741,417 | B2 | 5/2004 | Hsin et al. |
| 6,768,610 | B1 | 7/2004 | Morris et al. |
| 6,975,477 | B1 | 12/2005 | Hu et al. |
| 8,254,222 | B1 | 8/2012 | Tang |

(Continued)

OTHER PUBLICATIONS

Atsumi, Takenori, et al., "Triple-Stage-Actuator System of Head-Positioning Control in Hard Disk Drives," Journal IEEE Transactions on Magnetics, vol. 49, No. 6, Jun. 2013, Japan, 6 pages.

(Continued)

*Primary Examiner* — Nabil Z Hindi
(74) *Attorney, Agent, or Firm* — Holzer Patel Drennan

(57) ABSTRACT

Implementations disclosed herein include a method to synthesize the controller of a multi-stage servo control system with multiple actuators in a hard disk drive by dividing controller synthesis into multiple dual-stage steps. The method includes measuring a first output of a first plant corresponding to a first actuator, measuring a second output of a second plant corresponding to a second actuator, designing a first controller responsive to the first output, designing a second controller responsive to the second output, and combining the first output and the second output to obtain a first combined output in a first dual-stage. The method also includes designing a third controller responsive to the first combined output, measuring a third output from a third plant corresponding to a third actuator, designing a fourth controller responsive to the third output, and combining the first combined output and the third output to obtain a second combined output.

20 Claims, 5 Drawing Sheets

(56) References Cited

U.S. PATENT DOCUMENTS 9,536,553 B1     1/2017   Seo et al.
9,601,143 B1     3/2017   Seo et al.

OTHER PUBLICATIONS

Du, Chunling, et al., "Three-Stage Control for High Servo Bandwidth and Small Skew Actuation," Journal IEEE Transactions on Magnetics, vol. 51, No. 1, Jan. 2016, Singapore, 7 pages.

Nguyen, Huy, et al., "Draft: Settline Control of the Triple-Stage Hard Disk Drives Using Robust Output Feedback Model Predictive Control," ASME 2016 Dynamic Systems and Control Conference, Minneapolis, MN, Oct. 2016, 8 pages.

MULTI-STAGE SERVO CONTROL DESIGN SYSTEM

PRIORITY CLAIM

The present application claims benefit of priority to U.S. patent application Ser. No. 15/907,830, filed on Feb. 28, 2018 and titled "Multi-Stage Servo Control Design System," which is hereby incorporated by reference in its entirety.

SUMMARY

In one implementation, the disclosed technology provides a method to synthesize the controller of a multi-stage servo control system with multiple actuators in a hard disk drive by dividing controller synthesis into multiple dual-stage steps. The method includes measuring a first output of a first plant corresponding to a first actuator, measuring a second output of a second plant corresponding to a second actuator, designing a first controller responsive to the first output, designing a second controller responsive to the second output, and combining the first output and the second output to obtain a first combined output in a first dual-stage. The method also includes designing a third controller responsive to the first combined output, measuring a third output from a third plant corresponding to a third actuator, designing a fourth controller responsive to the third output, and combining the first combined output and the third output to obtain a second combined output.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTIONS OF THE DRAWINGS

DETAILED DESCRIPTION

Figure 1:
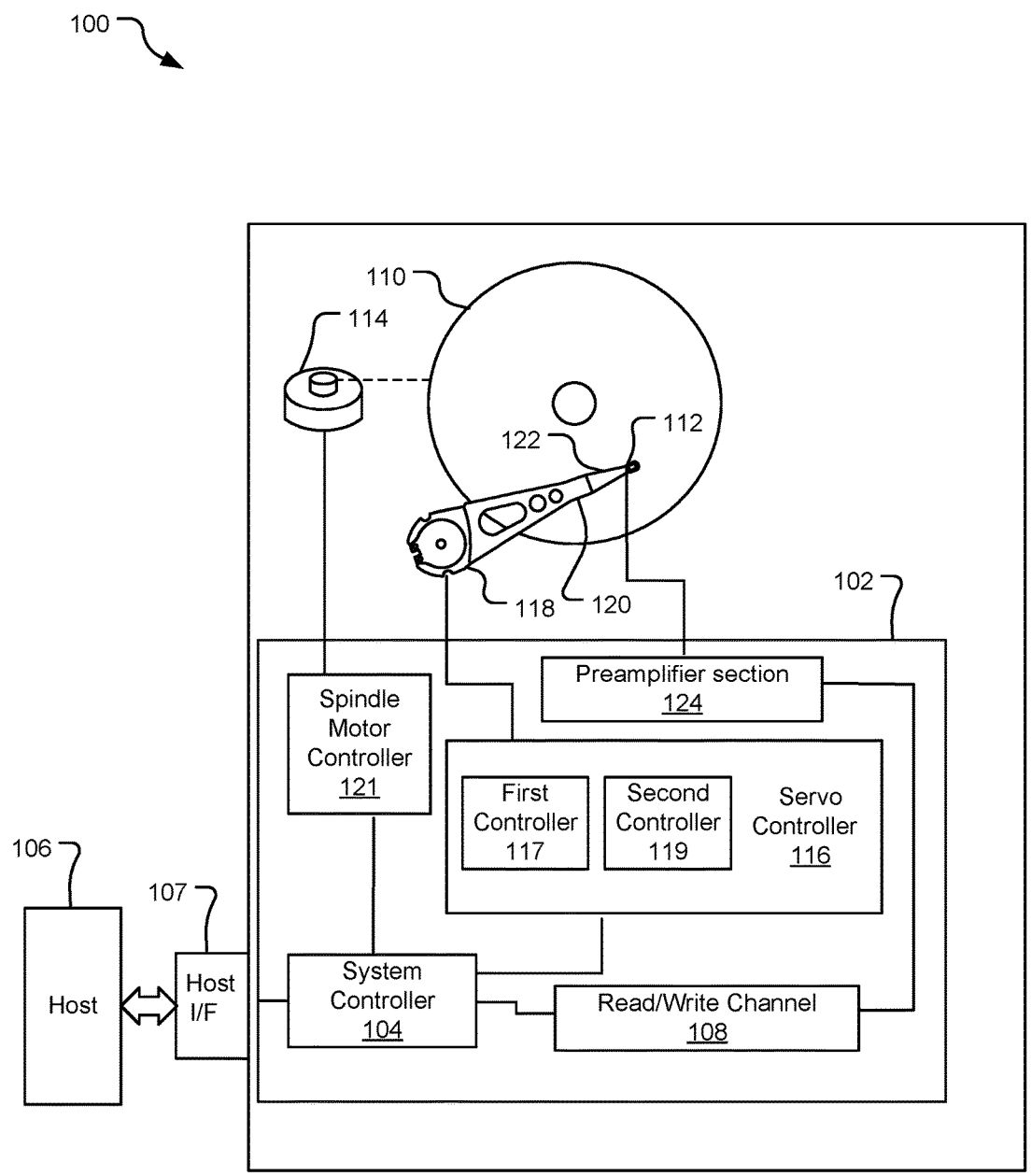
FIG. 1 is a block diagram of an example hard drive system with a multi-stage servo control system.

Increasing data storage has increased hard disk drive (HDD) density. A disk with more aerial density requires more control to position a read/write head on a specific data track. A high-bandwidth servo control system is required for high-precision track following of the magnetic head in an HDD. The servo control system includes actuators and control circuitry that position a read/write head over tracks of a hard disk recording medium. The read/write head reads servo data recorded on the disk which is used as feedback to set and maintain location. In order to achieve a higher bandwidth in a servo control system, the bandwidth of the actuator has to be improved.

With the form factor and cost constraints in HDDs, it can be difficult to increase the bandwidth of a voice coil motor (VCM), a common actuator that positions the magnetic head on track in a hard disk drive. Therefore, a dual-stage servo control system that utilizes two actuators, namely a VCM and a microactuator, can been employed in HDDs. A microactuator can move the suspension to control the head position.

There are two major microactuator designs: 1) a translational suspension-based design; and 2) a rotational slider-based design. Although the rotational slider-based microactuator may have a much higher bandwidth than the translational suspension-based design, the available stroke in a rotational slider-based microactuator may be a lot less. Without a sufficient stroke, a microactuator could easily saturate under large external disturbance events or with an aggressive seek trajectory. Thus, a tri-stage servo control system that composes a VCM, a suspension-based microactuator, and a slider-based microactuator may increase available bandwidth as well as provide sufficient stroke for an HDD.

In a tri-stage servo control system, controller synthesis techniques that design a single-input-dual-output (SIDO) controller for a dual-stage servo control system may be extended to a single-input-tri-output (SITO) controller. Although multiple-input-multiple-output (MIMO) control design techniques can be applied, obtaining an optimal SITO controller may be complex due to optimization requirements with multiple penalty weights, uncertainty weights, and performance weights.

The disclosed technology is directed towards synthesizing the controller of a multi-stage servo control system with three or more actuators in a hard disk drive. The method may divide the multi-stage controller synthesis into multiple dual-stage controller synthesis steps. Specifically, in each dual-stage controller synthesis step, a SIDO controller is optimized to achieve the desired closed-loop performance objective without saturating either of the two actuators. An open-loop system of the resulting dual-stage servo control system becomes one of the two actuators in the next dual-stage controller synthesis step.

The recursive controller synthesis steps end when the controllers for all actuators are designed. The multi-stage servo control design method simplifies the servo control optimization problem into multiple dual-stage controller synthesis steps, prevents saturation from occurring to each individual actuator, and is extendable to any numbers of actuators employed to position a magnetic head in a hard disk drive.

Referring to FIG. 1, a block diagram illustrates components of an example hard drive apparatus 100 with a multi-stage servo control system. The hard drive apparatus 100 includes circuitry 102 that facilitates reading from and writing to a recording medium, e.g., one or more magnetic disks 110. The circuitry 102 includes a system controller 104 that facilitates, among other things, communication with a host device 106 via a host interface 107. The host device 106 may include any electronic device that can be communicatively coupled to communicate with the circuitry 102, e.g., a general-purpose computer, etc.

The system controller 104 may include any combination of custom logic circuits, application specific integrated circuits (ASICs), general-purpose central processing unit (CPU), interface circuits, and may utilize instructions stored as firmware and/or software. The system controller 104 communicates with one or more read/write heads 112 via a read/write channel 108. The system controller 104 may determine a location on the disk 110 for data to be stored or retrieved, move the read/write head 112 to the locations (tracks) on the disk 110, read or write the data via the read/write channel 108, correct errors, transfer the data to/from the host 106, etc.

The read/write channel 108 converts data between the digital signals processed by the system controller 104 and the analog signals conducted through read/write head 112. The read/write channels 108 also provide servo data read from the disk(s) 110 to a servo controller 116. The servo controller 116 uses these signals to drive actuators. The servo controller 116, may include multiple controllers (e.g., a first controller 117, a second controller 119, . . . ). The servo controller 116 (specifically, one of the controllers in the servo controller 116) can control a VCM actuator 118 that rotates an arm 120 upon which the read/write head 112 is mounted. The head 112 is moved radially across different tracks of the disk 110 by the VCM actuator 118 while a spindle motor 114 rotates the disk 110. The system controller 104 controls the spindle motor 114 by way of a spindle motor controller 121.

The servo controller 116 (specifically, one of the controllers in the servo controller 116) can also control a microactuator 122 that provides fine position control for the read/write head 112. The servo controllers 116 may also include other controllers and control additional microactuators (not shown) as the disclosed technology is scalable. The microactuator 122 (and other microactuators) may be formed from, e.g., piezoelectric materials, and may be mounted proximate the read/write heads 112.

In the disclosed technology, the servo controller 116, including multiple controllers (e.g., a first controller 117 and a second controller 119), may be synthesized using a dual-stage, closed loop controller. In each dual-stage controller synthesis step, a controller is optimized to achieve the desired closed-loop performance objective without saturating any of the two actuators. An open-loop system of the resulting dual-stage servo control system becomes one of the two actuators in the next dual-stage controller synthesis step, as described in more detail in FIG. 2.

During write operations, the read/write channel 108 provides analog signals that are delivered to the read/write head 112 by way of a preamplifier section 124. The preamplifier section 124 amplifies and conditions the write signals sent to a write coil of the read/write head 112. During read operations, the read/write head 112 transmits signals to the preamplifier section 124, which conditions the analog signals before sending the signals to the read/write channel 108.

Figure 2:
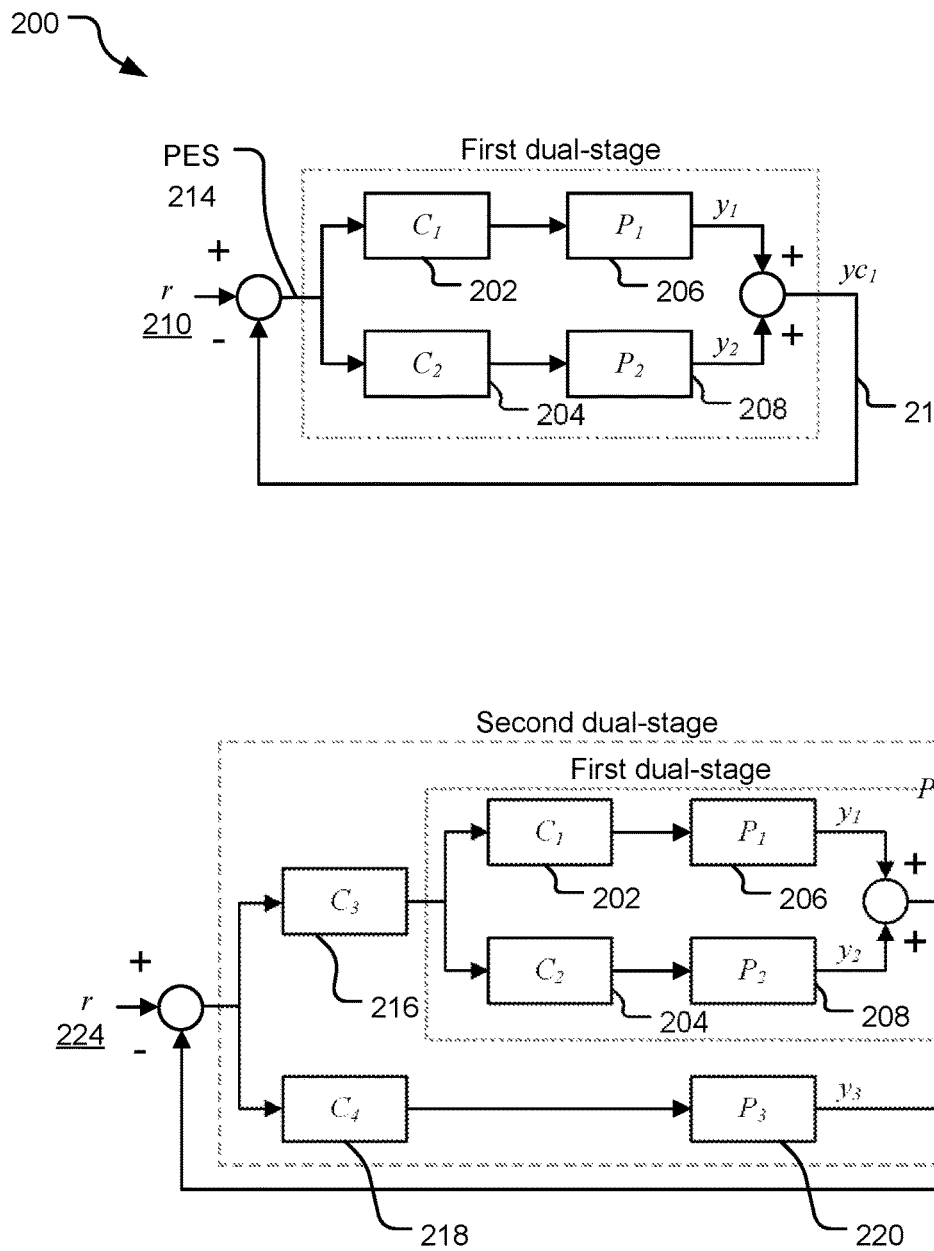
FIG. 2 is a block diagram of an example servo control system.

FIG. 2 is a block diagram of an example servo control system 200. A first controller 202 ($C_1$) and a second controller 204 ($C_2$) output signals for plants 206 and 208 ($P_1$ and $P_2$) that respectively correspond to a first actuator and a second actuator. As shown in a first dual-stage, the combined output (designated by $y_{C1}$ in the figure) of the actuators (expressed as y1 and y2, respectively) positions a read/write head over a recording medium, as indicated by position signal 212. This is referred to as a dual-stage controller.

In this example, the first plant 206 may represent a large-motion actuator such as a voice coil motor (VCM). The VCM provides coarse, low-frequency positioning of the read/write head. The second plant 208 may represent a small-motion actuator, such as a piezoelectric microactuator. The microactuator provides fine, high-frequency positioning of the read/write heads. Generally, the position signal is read from servo marks on the recording medium.

A reference input 210 is a command that drives the read/write head to a particular position. For steady-state operation (e.g., tracking) the reference input 210 is zero. The difference between the position signal 212 and the reference input 210 is the position error signal (PES) 214. The servo control system attempts to minimize PES in order to accurately read and write data from and to the recording medium.

Because of the fine positioning required of the servo plants 206 and 208 and the unpredictability of the environment in which the HDD may be used, controllers may be designed in a dual-stage process. Specifically, the first plant $P_1$ may be measured, and the first controller 202 ($C_1$) may be designed responsive to the measurement of the first output (y1) of the first plant $P_1$ in the first dual-stage. The second plant $P_2$ may be measured, and the second controller 204 ($C_2$) may be designed responsive to the measurement of the second output (y2) of the second plant $P_1$ in the first dual-stage. Different dual-stage controller design methods (e.g., mu-synthesis) may be used to design $C_1$ and $C_2$. The first output and the second output may be added to each other to yield a first combined output ($y_{C1}$).

The first combined output ($y_{C1}$) can be used as one of the actuators in a second dual-stage. A third controller 216 ($C_3$) may be designed based on the first combined output ($y_{C1}$). A third plant $P_3$ may be measured, and fourth controller 218 ($C_4$) may be designed responsive to the measurement of a third output (y3) of the third plant 220 ($P_3$) in the second dual-stage. The first combined output ($y_{C1}$) and the third output (y3) may be added to each other to yield a second combined output ($y_{C2}$).

The second combined output ($y_{C2}$) may be compared with a reference input 224 (r) to provide closed loop positional control. In subsequent dual-stages, this operation may be repeated. The disclosed technology is scalable to any number of actuators. For example, there may be a third dual stage that uses the second combined output ($y_{C2}$) as an actuator to design a fifth controller (see controller 428, described and shown in FIG. 4), and a fourth actuator to design a sixth controller (see controller 430, described and shown in FIG. 4).

In some implementations, an open loop of the a dual-stage may be measured. Specifically, a verification operation may be performed via simulation and in-drive measurement to verify servo code functionality and calibrate normalization gain. The verification operation may occur after the first output and the second output are combined in the first dual-stage. In some implementations, the verification operations occur initially after the second dual-stage, and in subsequent dual-stages.

In some implementations, a penalty weight may be applied to a microactuator's controller to constrain the gain at certain frequency ranges and prevent saturation. In some implementations, PES may be applied to check controller output and assess stroke usage.

Figure 3:
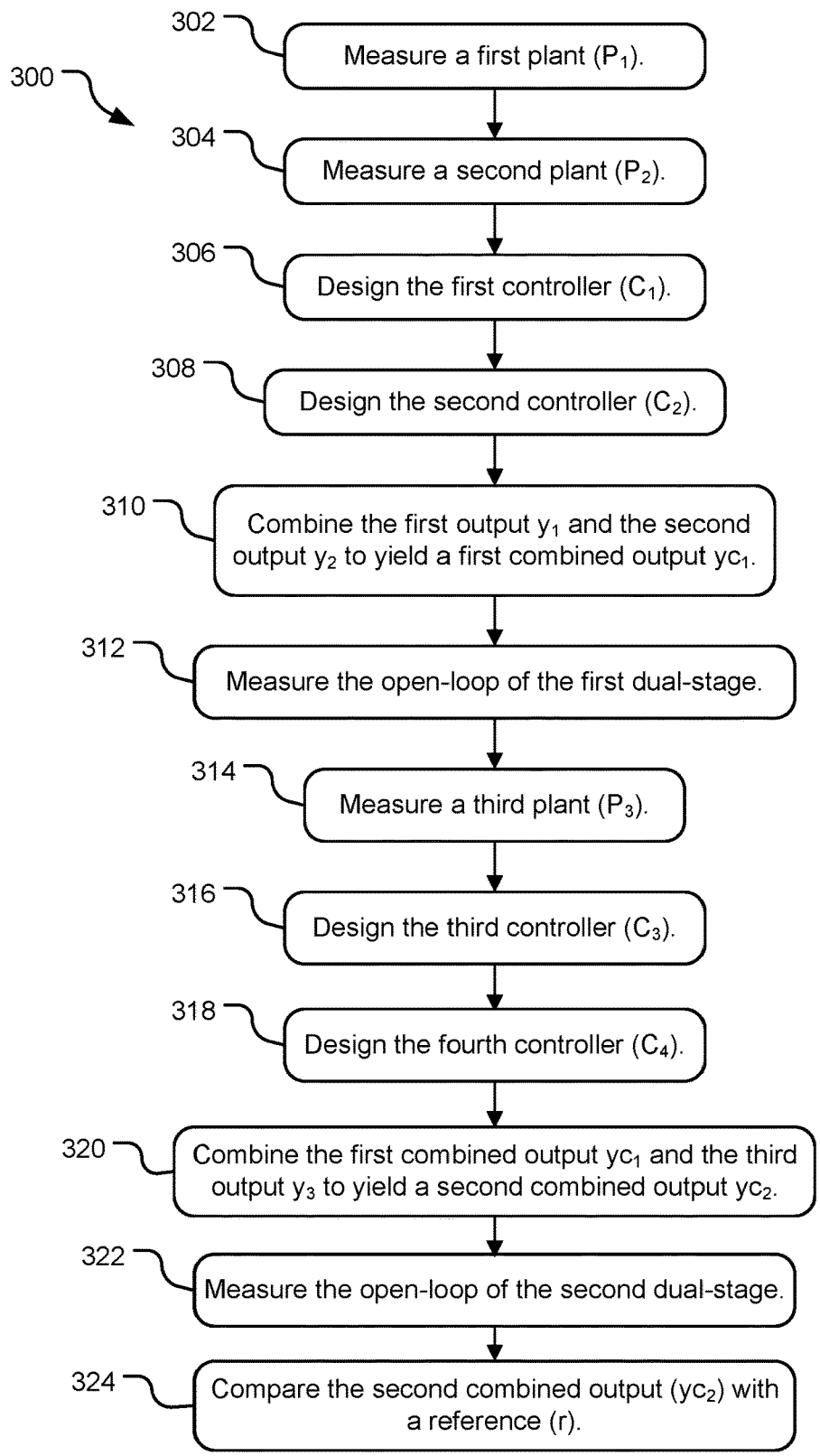
FIG. 3 is a flowchart of example operations for synthesizing a controller of a servo control system.

FIG. 3 is a flowchart of example operations 300 for synthesizing a controller of a servo control system. In operations 300, a multi-stage servo control design includes three plants. An operation 302 measures a first output of a first plant in a first dual-stage. An operation 304 measures a second output of a second plant in the first dual-stage. An operation 306 designs a first controller responsive to the measurement of the first output. An operation 308 designs a second controller responsive to the measurement of the second output. An operation 310 combines the first output and the second output to yield a first combined output. An operation 312 measures an open loop of the first dual-stage to perform verification. If necessary, operations 306, 308, 310, and 312 repeat until the open loop of the first dual-stage is satisfactory, as depicted by the arrows.

For purposes of this disclosure, an open loop of a dual-stage being "satisfactory" means until the open loop frequency response meets the requirements (e.g., bandwidth, disturbance rejection capability, and stability margins). A controller designer has a desired frequency response of the open-loop, including the bandwidth, the gain and phase response at low, mid, and high frequency ranges, as well as gain and phase margins. A main priority is to be able to follow the reference position trajectory (e.g., for a tracking case, such as a seek), and to better reject external disturbance (e.g., for a regulation case in which the reference input is zero in order to stay on track). These design specifications for the control loop depend on the product requirements and disturbance spectrum in which the HDD will be operating. Thus, the design process is iterated to obtain controller designs that yield the desirable open-loop frequency response.

An operation 314 measures a third output from a third plant, the third plant corresponding to a third actuator in a second dual-stage. An operation 316 designs a third controller responsive to the first combined output in the second dual-stage. An operation 318 designs a fourth controller responsive to the third output. An operation 320 combines the first combined output and the third output to obtain a second combined output. An operation 322 measures an open loop of the second dual-stage to perform verification. If necessary, operations 316, 318, 320, and 322 repeat until the open loop of the second dual-stage is satisfactory, as depicted by the arrows. An operation 324 compares the second combined output with a reference input to provide closed loop positional control.

Figure 4:
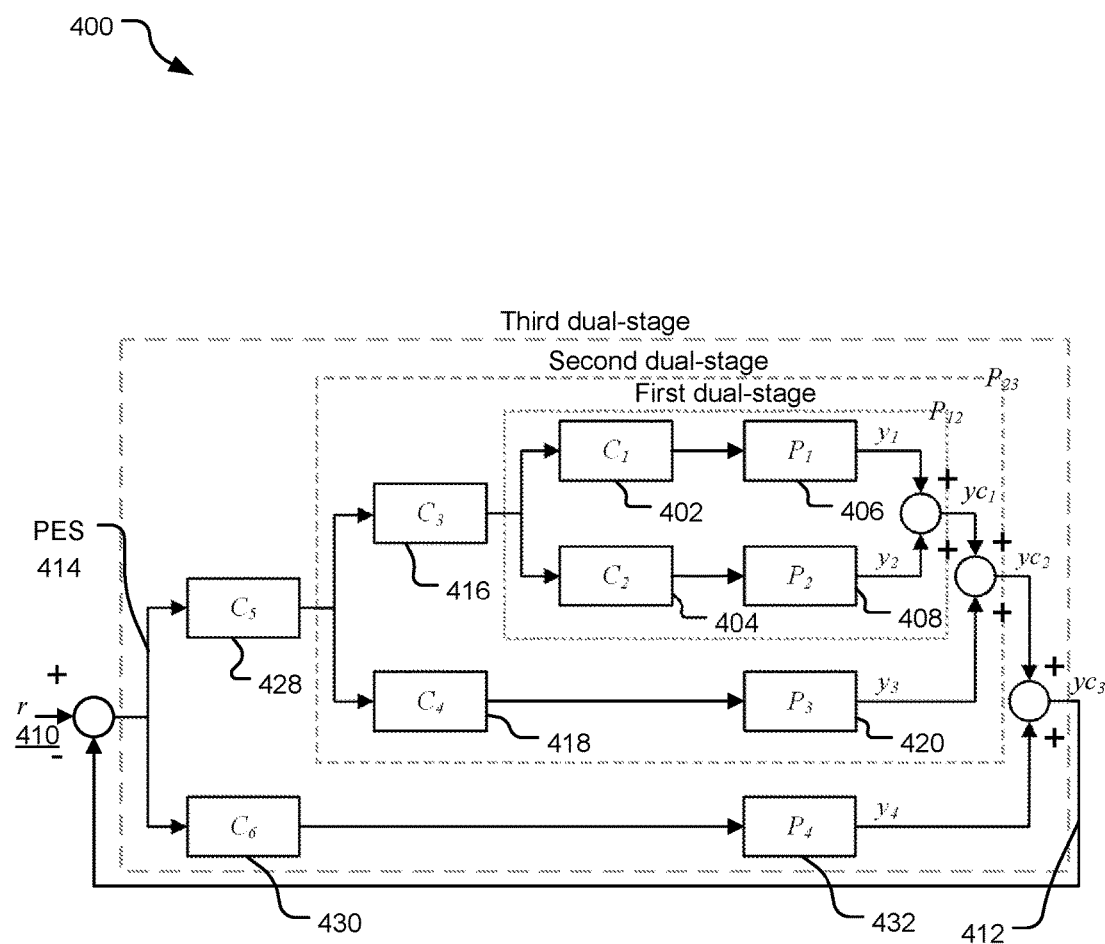
FIG. 4 is a block diagram of another example servo control system.

FIG. 4 is a block diagram of an example servo control system 400. FIG. 4 demonstrates the scalability of the disclosed technology. A first controller 402 ($C_1$) and a second controller 404 ($C_2$) output signals for plants 406 and 408 ($P_1$ and $P_2$) that respectively correspond to a first actuator and a second actuator.

As shown in a first dual-stage, the combined output (designated by $y_{C1}$ in the figure) of the actuators (expressed as y1 and y2, respectively) positions a read/write head over a recording medium.

In this example, the first plant 406 may represent a large-motion actuator such as a VCM. The VCM provides coarse, low-frequency positioning of the read/write head. The second plant 408 may represent a small-motion actuator, such as a piezoelectric microactuator. The microactuator provides fine, high-frequency positioning of the read/write heads. Generally, the position signal is read from servo marks on the recording medium.

A reference input 410 is a command that drives the read/write head to a particular position. For steady-state operation (e.g., tracking) the reference input 410 is zero. The difference between the position signal 412 and the reference input 410 is the PES 414. The servo control system attempts to minimize PES in order to accurately read and write data from and to the recording medium.

Because of the fine positioning required of the servo plants 406 and 408 and the unpredictability of the environment in which the HDD may be used, controllers may be designed in a dual-stage process. Specifically, the first plant $P_1$ may be measured, and the first controller 402 ($C_1$) may be designed responsive to the measurement of the first output (y1) of the first plant $P_1$ in the first dual-stage. The second plant $P_2$ may be measured, and the second controller 404 ($C_2$) may be designed responsive to the measurement of the second output (y2) of the second plant $P_1$ in the first dual-stage. The first output and the second output may be added to each other to yield a first combined output ($y_{C1}$).

The first combined output ($y_{C1}$) can be used as one of the actuators in a second dual-stage. A third controller 416 ($C_3$) may be designed based on the first combined output ($y_{C1}$). A third plant 420 ($P_3$) may be measured, and fourth controller 418 ($C_4$) may be designed responsive to the measurement of a third output (y3) of the third plant 420 ($P_3$) in the second dual-stage. The first combined output ($y_{C1}$) and the third output (y3) may be added to each other to yield a second combined output ($y_{C2}$).

In the implementation shown in FIG. 4, the second combined output ($y_{C2}$) can be used as one of the actuators in a third dual-stage. A fifth controller 428 ($C_5$) may be designed based on the second combined output ($y_{C2}$). A fourth plant 432 ($P_4$) may be measured, and a sixth controller 430 ($C_6$) may be designed responsive to the measurement of a fourth output (y4) of the fourth plant 432 ($P_4$) in the third dual-stage. The second combined output ($y_{C2}$) and the fourth output (y4) may be added to each other to yield a third combined output ($y_{C3}$).

The third combined output ($y_{C3}$) may be compared with a reference input 410 (r) to provide closed loop positional control. In subsequent dual-stages, this operation may be repeated. The disclosed technology is scalable to any number of actuators. For example, there may be a fourth dual stage that uses the third combined output ($y_{C3}$) as an actuator to design a seventh controller, and a fifth actuator to design eighth controller.

In some implementations, an open loop of the a dual-stage may be measured. Specifically, a verification operation may be performed via simulation and in-drive measurement to verify servo code functionality and calibrate normalization gain. The verification operation may occur after the first output and the second output are combined in the first dual-stage. In some implementations, the verification operations occur initially after the second dual-stage, and in subsequent dual-stages.

In some implementations, a penalty weight may be applied to a microactuator's controller to constrain the gain at certain frequency ranges and prevent saturation. In some implementations, PES may be applied to check controller output and assess stroke usage.

Figure 5:
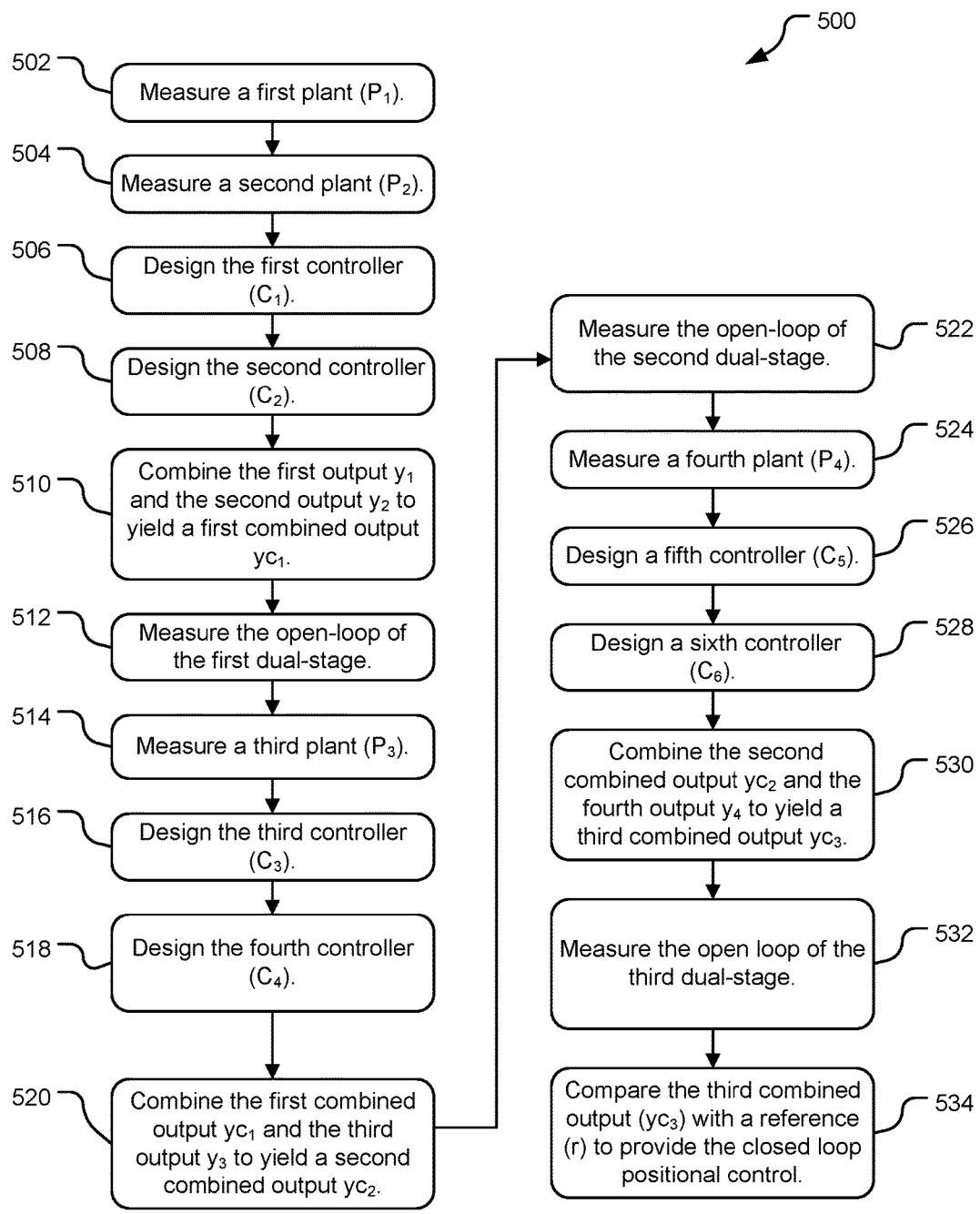
FIG. 5 is a flowchart of example operations for synthesizing a controller of another servo control system.

FIG. 5 is a flowchart of example operations 500 for synthesizing a controller of a servo control system. FIG. 5 demonstrates the scalability of the disclosed technology. In operations 500, a multi-stage servo control design includes four plants. An operation 502 measures a first output of a first plant in a first dual-stage. An operation 504 measures a second output of a second plant in the first dual-stage. An operation 506 designs a first controller responsive to the measurement of the first output. An operation 508 designs a second controller responsive to the measurement of the second output. An operation 510 combines the first output and the second output to yield a first combined output. An operation 512 measures an open loop of the first dual-stage to perform verification. If necessary, operations 506, 508, 510, and 512 repeat until the open loop of the first dual-stage is satisfactory, as depicted by the arrows.

An operation 514 measures a third output from a third plant, the third plant corresponding to a third actuator. An operation 516 designs a third controller responsive to the first combined output in a second dual-stage. An operation 518 designs a fourth controller responsive to the third output. An operation 520 combines the first combined output and the third output to obtain a second combined output. An operation 522 measures an open loop of the second dual-stage to perform verification. If necessary operations 516, 518, 520, and 522 repeat until the open loop of the second dual-stage is satisfactory.

An operation 524 measures a fourth output from a fourth plant, the fourth plant corresponding to a fourth actuator. An operation 526 designs a fifth controller responsive to the second combined output in a third dual-stage. An operation 528 designs a sixth controller responsive to the fourth output. An operation 530 combines the second combined output and the fourth output to obtain a third combined output. An operation 532 measures an open loop of the third dual-stage to perform verification. If necessary, operations 526, 528, 530, and 532 repeat until the open loop of the third dual-stage is satisfactory, as depicted by the arrows. An operation 534 compares the third combined output with a reference input to provide closed loop positional control.

The implementations of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method of synthesizing a servo controller, comprising:
    generating a first combined output in a first dual-stage, including:
        measuring a first output of a first plant;
        measuring a second output of a second plant;
        designing a first controller responsive to the first output;
        designing a second controller responsive to the second output; and
        combining the first output and the second output to obtain the first combined output; and
    generating a second combined output in a second dual-stage, including:
        designing a third controller responsive to the first combined output;
        measuring a third output from a third plant;
        designing a fourth controller responsive to the third output; and
        combining the first combined output and the third output to obtain the second combined output.

2. The method of claim 1, wherein the first plant corresponds to a first actuator, the second plant corresponds to a second actuator, and the third plant corresponds to a third actuator.

3. The method of claim 1, further comprising providing closed loop positional control of a read/write head.

4. The method of claim 1, further comprising measuring an open-loop of the first dual-stage.

5. The method of claim 1, further comprising measuring an open-loop of the second dual-stage.

6. The method of claim 1, further comprising:
    generating a third combined output in a third dual-stage that positions a read/write head in a closed loop hard disk servo control system, including:
        designing a fifth controller responsive to the second combined output;
        measuring a fourth output from a fourth plant, the fourth plant corresponding to a fourth actuator;
        designing a sixth controller responsive to the fourth output; and
        combining the second combined output and the fourth output to obtain the third combined output.

7. The method of claim 6, further comprising comparing the third combined output with a reference input to provide closed loop positional control.

8. A method comprising:
    designing two controllers in a first dual-stage in a servo system including:
        measuring a first output of a first plant;
        measuring a second output of a second plant;
        designing a first controller responsive to the first output;
        designing a second controller responsive to the second output; and
        combining the first output and the second output to obtain a first combined output;
    measuring an open-loop of the first dual-stage;
    designing two controllers in a second dual-stage including:
        designing a third controller responsive to the first combined output;
        measuring a third output from a third plant; and
        designing a fourth controller responsive to the third output; and
        combining the first combined output and the third output to obtain a second combined output.

9. The method of claim 8, further comprising comparing the second combined output with a reference input to provide closed loop positional control of a magnetic head.

10. The method of claim 8, further comprising measuring an open-loop of the second dual-stage.

11. The method of claim 8, further comprising:
    applying a penalty weight to the microactuator.

12. The method of claim 8, wherein the first plant corresponds to a first actuator, the second plant corresponds to a second actuator, and the third plant corresponds to a third actuator.

13. An apparatus comprising:
    a servo controller in a servo system to monitor magnetic head position signals, the servo controller comprising:
        a plurality of controllers configured responsive to output signals for the plurality of plants, including:
            a first controller, the first controller configured responsive to a first output signal for a first plant, and a second controller, the second controller configured responsive to a second output signal for a second plant, in a first dual-stage; and
            a third controller, the third controller configured responsive to a first combined output signal including the first output signal and the second output signal, and a fourth controller, the fourth controller configured responsive to a third output signal, in a second dual-stage.

14. The apparatus of claim 13, further comprising:
a read/write channel coupled to servo controller and configured to communicate with multi-stage actuators that position a read/write head.

15. The apparatus of claim 13, further comprising:
a fifth controller, the fifth controller configured responsive to a second combined output signal including the first combined output signal and the third output signal; and
a sixth controller, the sixth controller configured responsive to a fourth output signal.

16. The apparatus of claim 13, wherein the first plant corresponds to a voice coil motor.

17. The apparatus of claim 13, wherein the second plant corresponds to a microactuator.

18. The apparatus of claim 13, wherein the servo controller is a tri-stage servo controller.

19. The apparatus of claim 13, wherein the servo controller provides closed loop positional control of a read/write head.

20. The apparatus of claim 13, wherein the servo control system is a hard disk servo control system.

* * * * *